United States Patent
Ranmuthu

(10) Patent No.: US 7,453,659 B2
(45) Date of Patent: Nov. 18, 2008

(54) CIRCUIT AND METHOD FOR WRITE CURRENT DRIVER

(75) Inventor: Indumini W. Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 138 days.

(21) Appl. No.: 11/414,979

(22) Filed: May 1, 2006

(65) Prior Publication Data

US 2006/0268443 A1 Nov. 30, 2006

Related U.S. Application Data

(60) Provisional application No. 60/685,790, filed on May 31, 2005.

(51) Int. Cl.
*G11B 5/02* (2006.01)
(52) U.S. Cl. .......................... 360/68; 327/110
(58) Field of Classification Search .................. None
See application file for complete search history.

(56) References Cited

U.S. PATENT DOCUMENTS

| | | | | |
|---|---|---|---|---|
| 5,869,988 A | * | 2/1999 | Jusuf et al. ................ | 327/110 |
| 6,246,533 B1 | * | 6/2001 | Davis et al. ................ | 360/68 |
| 6,297,921 B1 | * | 10/2001 | Price et al. ................ | 360/68 |
| 2005/0117244 A1 | * | 6/2005 | Ranmuthu .................. | 360/68 |
| 2005/0231843 A1 | * | 10/2005 | Venca et al. ............... | 360/46 |
| 2006/0119970 A1 | * | 6/2006 | Hayashi et al. ............. | 360/68 |

* cited by examiner

*Primary Examiner*—Joseph Feild
*Assistant Examiner*—Dan I Davidson
(74) *Attorney, Agent, or Firm*—Tum Thach; Wade J. Brady, III; Frederick J. Telecky, Jr.

(57) ABSTRACT

System and method for write current drivers for inductive heads used in mass storage drives. A preferred embodiment comprises a write current circuit coupled to an inductive write head, a MOS transistor boost circuit and a matching circuit, both coupled to the write current circuit. The write current circuit provides a first current to the inductive write head, while the MOS transistor boost circuit provides a second current for a specified duration to the inductive write head when the MOS transistor boost circuit receives a control signal. The matching circuit selectively decouples a resistive element from the inductive write head when it receives the control signal. The MOS transistor boost circuit can accelerate the transition in a switching of the polarity of the write current and the matching circuit helps to reduce ringing without negatively affecting the speed of the polarity switching by decoupling when the second current is provided.

15 Claims, 3 Drawing Sheets

CIRCUIT AND METHOD FOR WRITE CURRENT DRIVER

This application claims the benefit of U.S. Provisional Application No. 60/685,790, filed on May 31, 2005, entitled "MOS Write Driver," which application is hereby incorporated herein by reference.

TECHNICAL FIELD

The present invention relates generally to a system and a method for mass storage media, and more particularly to a system and a method for write current drivers for inductive heads used in mass storage drives.

BACKGROUND

Information stored in a disk drive can be stored in binary form as either a logical one (1) or a logical zero (0), with the information being encoded as a magnetic flux on a magnetic platter of the disk drive. Typically, a logical one is represented as a transition in a magnetic flux on the magnetic platter while a logical zero is represented as an absence of a transition in a magnetic flux. The magnetic flux on the magnetic platter can be affected by an inductive write head. The transitions in the magnetic flux can be created by switching the polarity of a write current on the inductive write head. Since it takes a finite amount of time to change the polarity of a write current applied by the inductive write head, the transitions in the magnetic flux can consume a finite amount of space on the magnetic platter. A fast magnetic flux transition will require a small amount of space, while a slow magnetic flux transition will require a large amount of space. Since the amount of space on a magnetic platter is fixed, a faster rate of transition in the magnetic flux can mean that more information can be stored in the disk drive.

With reference now to FIG. 1, there is shown a diagram illustrating a portion of an exemplary disk drive 100. The disk drive 100 includes a magnetic platter 105, however, some disk drives may have more than one magnetic platter. The magnetic platter 105 is used to store the information written by an inductive write head 110. The information is stored on the magnetic platter 105 in the form of magnetic flux and transitions in the magnetic flux. A writer circuit 115 is used to provide a write current to the inductive write head 110. A steady state write current flowing through the inductive write head 110 will produce a magnetic flux of a certain magnitude. A transition in the magnetic flux can be achieved by switching a polarity of the write current flowing through the inductive write head 110.

Output capacitances associated with writer circuit 115 combined with the inductive nature of the inductive write head 110 can cause ringing in the write current, which can delay the settling of the write current to a steady state DC value after the occurrence of a switch in the polarity of the write current. The ringing can negatively affect the placement of the transition on the magnetic platter as well as the size of the transition. The placement of the transition can negatively affect the reliability of the disk drive 100, while the size of the transition affects the amount of information that can be stored in the disk drive 100.

A prior art technique that has been used to reduce the ringing in the write current after a polarity switch is to use matching resistors on the inductive write heads. The matching resistors can reduce an impedance mismatch between the write circuitry and the inductive write head, thereby reducing the ringing in the write current.

Another prior art technique that has been used to reduce the ringing in the write current is to switch the polarity of the write current prior to the write current reaching a steady state value. This can remove the need to wait for the write current to settle, effectively shortening the duration of the ringing, and therefore maintains a fast transition write current, enabling increased storage capacity in the disk drive.

One disadvantage of the prior art is that the matching resistors can dissipate a portion of the write current being provided to the inductive write head. The reduced write current can negatively affect the transition time of the write current, therefore, extending the transition of the magnetic flux and decreasing the storage capacity of the disk drive.

Another disadvantage of the prior art is that the switching of the polarity of the write current prior to the write current reaching a steady state can decrease placement accuracy of the information being written to the magnetic platter and can result in a decrease in the reliability of the disk drive. Furthermore, if the switching of the write current occurs while the write current has not fully settled from a prior transition, the switching of the write current may result in unexpected and undesired current levels.

SUMMARY OF THE INVENTION

These and other problems are generally solved or circumvented, and technical advantages are generally achieved, by preferred embodiments of the present invention which provides a system and a method for write current drivers for inductive heads used in mass storage drives.

In accordance with a preferred embodiment of the present invention, a writer circuit for an inductive write head is provided. The writer circuit includes a write current circuit coupled to the inductive write head, a metal-oxide semiconductor transistor boost circuit coupled to the write current circuit, and a matching circuit coupled to the inductive write head. The write current circuit provides a first current to the inductive write head and the metal-oxide semiconductor transistor boost circuit provides a second current for a specified time period to the inductive write head that is responsive to a control signal. A sum of the first current and the second current is a write current for the inductive write head. The matching circuit selectively decouples a resistive element from the inductive write head in response to the control signal.

In accordance with another preferred embodiment of the present invention, a mass storage device is provided. The mass storage device includes a magnetic storage media, an inductive write head magnetically coupled to the magnetic storage media, a write current circuit coupled to the inductive write head, a metal-oxide semiconductor transistor boost circuit coupled to the write current circuit and the inductive write head, and a matching circuit coupled to the inductive write head. The inductive write head imparts a magnetic flux of desired orientation based on a write current flowing through the inductive write head and the write current circuit provides a first current to the inductive write head and the metal-oxide semiconductor transistor boost circuit provides a second current for a specified time period to the inductive write head in response to a control signal. The matching circuit selective decouples a resistive element from the inductive write head in response to the control signal. The write current is a sum of the first current and the second current.

In accordance with another preferred embodiment of the present invention, a method for providing a write current to an inductive write head is provided. The method includes providing a first current, providing a second current for a specified period of time, and decoupling a matching circuit from the inductive write head for the specified period of time.

An advantage of a preferred embodiment of the present invention is that a boost current can be added to the write current to shorten a time needed to switch write current polarity. This can help to shorten the magnetic flux transition and therefore enable an increase in the storage capacity of the disk drive.

A further advantage of a preferred embodiment of the present invention is that matching resistors are used to help reduce ringing in the write current when there is a switch in write current polarity. However, when the write current is actually switching, the matching resistors do not dissipate any of the current so the presence of the matching resistors do not slow down the write current polarity switching.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely magnetic mass storage disk drives with either longitudinal or perpendicular recording. The invention may also be applied, however, to other magnetic mass storage drives, such as mass storage tape drives, floppy and flexible disk drives, magneto optical drives, and so forth.

Figure 1:
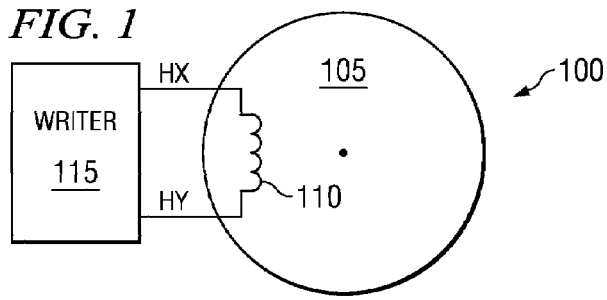
FIG. 1 is a diagram of a portion of a disk drive.
Figure 2:
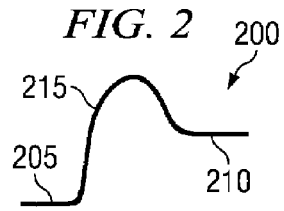
FIG. 2 is a diagram of a write current waveform, according to a preferred embodiment of the present invention.

With reference now to FIG. 2, there is shown a diagram illustrating a waveform 200 representing an exemplary write current for use in an inductive write head, according to a preferred embodiment of the present invention. The waveform 200 illustrates the write current as it transitions from a first steady state DC level 205 to a second steady state DC level 210. However, rather than steadily transitioning from the first steady state DC level 205 to the second steady state DC level 210, the write current receives a boost current (shown as curve 215) to help the magnetic flux to transition more rapidly to the second steady state. The boost current (curve 215) may take the write current to a level that is greater than the second steady state DC level 210, however, the write current rapidly drops back down to the second steady state DC level 210. The rapid transition in the write current provided by the boost current rapidly changes the write current from the first steady state DC level 205 to the second steady state DC level 210. Although not shown, a similar boost current can be used for a corresponding write current transition from the second steady state DC level 210 to the first steady state DC level 205.

Figure 3:
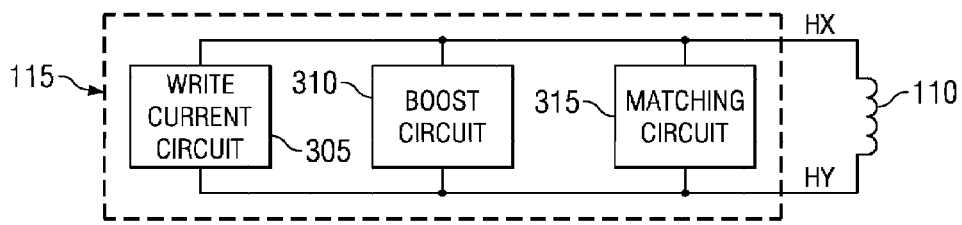
FIG. 3 is a diagram of a functional view of a writer circuit, according to a preferred embodiment of the present invention.

With reference now to FIG. 3, there is shown a diagram illustrating a functional view of a writer circuit 115, according to a preferred embodiment of the present invention. The writer circuit 115 can be logically partitioned into three parts based on the intended function of the part. A first part can be a write current circuit 305 that provides the DC write current needed to impart the desired magnetic flux on the magnetic platter of the disk drive by way of the inductive write head 110. A second part of the writer circuit 115 can be a boost circuit 310. The boost circuit 310 can provide a secondary current during the switch in the polarity of the DC write current produced by the write current circuit 305. A third part of the writer circuit 115 can be a matching circuit 315 that can reduce ringing in the DC write current resulting from the polarity switch. The three parts of the writer circuit 115 are capable of operating independently of one another and it is possible to implement the writer circuit 115 with all three parts or less than all three parts.

Figure 4:
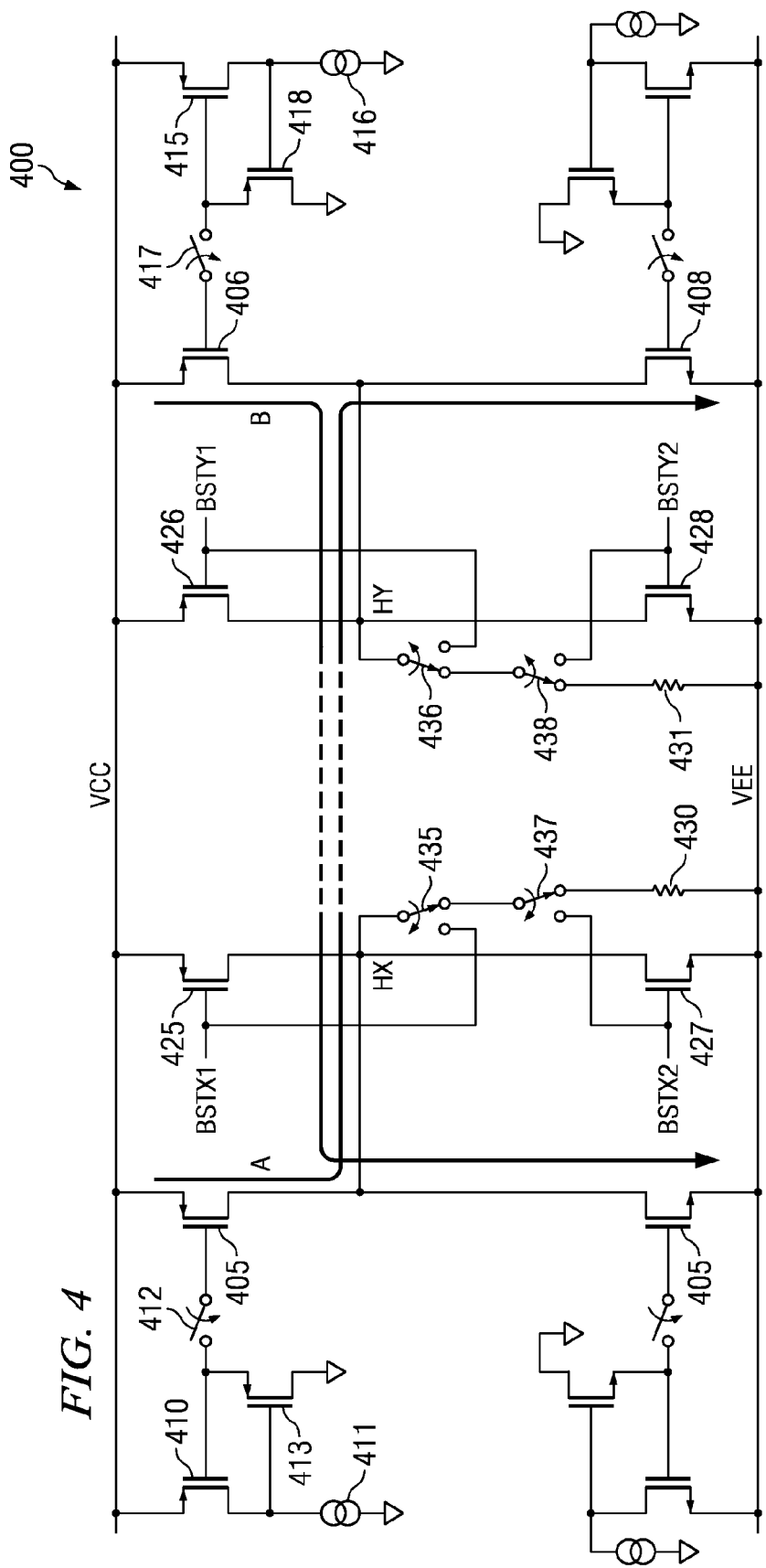
FIG. 4 is a diagram of an exemplary writer circuit, according to a preferred embodiment of the present invention.

With reference now to FIG. 4, there is shown a diagram illustrating an exemplary writer circuit 400 for use in providing a write current to an inductive write head 110, according to a preferred embodiment of the present invention. As discussed previously, the writer circuit 400 shown in FIG. 4 can logically be partitioned into three parts, with each part being capable of operating independently of the other two parts. A first part of the writer circuit 400, a write current circuit (such as the write current circuit 305 (FIG. 3)), comprises four transistors (transistor 405, transistor 406, transistor 407, and transistor 408) arranged in an H-bridge configuration. Preferably, the transistors in the writer circuit 400 are MOS transistors, however, depending upon implementation, bipolar junction transistors can be used in place of some of the transistors in the writer circuit 400. The transistors 405 and 406 of the write current circuit are preferably P-type MOS transistors and the transistors 407 and 408 are preferably N-type MOS transistors.

To provide a DC write current with a given polarity, for example, a DC write current flowing from node HX to node HY, the transistor 405 and the transistor 408 should be turned on and the transistor 406 and the transistor 407 should be turned off, providing a current path A. The DC write current is provided by current mirrors coupled to gate terminals of the four transistors. A current mirror created using a transistor 410 in conjunction with the transistor 405 will result in a mirroring of a current in a current source 411 being mirrored through the transistor 405 and flowing through the node HX, the inductive write head 110, node HY, and the transistor 408. A switch 412 can selectively couple or decouple the current path, while a transistor 413 can be used to provide more strength to the current mirror, enhancing the amount of current being produced. A similar current mirror created with the transistor 408 can further increase the amount of current available. The transistor 413 can be replaced with a BJT transistor, namely a PNP transistor in an alternate implementation of the writer circuit 400. A transistor serving a similar function in the current mirror containing the transistor 408 can also be replaced with a BJT transistor (preferably an NPN transistor).

To reverse the polarity of the DC write current, the transistor 405 and the transistor 408 should be turned off and the transistor 406 and the transistor 407 should be turned on, providing a current path B. The DC write current with the reversed polarity is also provided using current mirrors. A current mirror created using a transistor 415 in conjunction with the transistor 406 will result in a mirroring of a current in a current source 416 being mirrored through the transistor 406 and flowing through the node HY, the inductive write head 110, the node HX, and the transistor 407. A switch 417 can selectively couple or decouple the current path, while a transistor 418 can be used to provide more strength to the current mirror, enhancing the amount of current being produced. A similar current mirror created with the transistor 407 can further increase the amount of current available.

A second part of the writer circuit 400, a boost circuit (such as the boost circuit 310 (FIG. 3)), comprises four transistors (transistor 425, transistor 426, transistor 427, and transistor 428) arranged in an H-bridge configuration. The transistors 425 and 426 of the boost circuit are preferably P-type MOS transistors and the transistors 427 and 428 are preferably N-type MOS transistors. The boost circuit operates in a manner that is similar to the write current circuit. To provide a boost for a write current transition when the current is flowing from node HX to node HY, turn on the transistor 425 and the transistor 428 and turn off the transistor 426 and the transistor 427. A current path from VCC to VEE is created, adding to the current already being provided by the write current circuit. Similarly, to provide a boost for a write current transition when the current is flowing from node HY to node HX, turn off the transistor 425 and the transistor 428 and turn on the transistor 426 and the transistor 427.

The state of the transistor 425, the transistor 426, the transistor 427, and the transistor 428 can be controlled by signals applied to gate terminals of the transistors. As shown in FIG. 4, the transistor 425 and the transistor 426 are P-type MOS transistors and the transistor 427 and the transistor 428 are N-type MOS transistors. The signals can be referenced as BSTX1 for the transistor 425, BSTY1 for the transistor 426, BSTX2 for the transistor 427, and BSTY2 for the transistor 428. In order to turn on the transistor 425 and the transistor 426, BSTX1 and BSTY1 should be at a logical zero level, while to turn on the transistor 427 and the transistor 428, BSTX2 and BSTY2 should be at a logical one level. The application of the boost current can be controlled by controlling the state of the transistors and can be programmed for duration, for example, from 0 seconds to about 1 nano-seconds, or magnitude, for example, from 0 amps to 150 milli-amps.

A third part of the writer circuit 400, a matching circuit (such as the matching circuit 315 (FIG. 3)), comprises two resistors, a resistor 430 and a resistor 431, with one resistor coupled to either node HX or node HY. The resistor 430 and the resistor 431 function to match an impedance difference between the writer circuit 400 and the inductive write head 110. The matching circuit also comprises switches (switch 435, switch 436, switch 437, and switch 438) that can be used to couple and de-couple the resistor 430 and the resistor 431 to node HX and node HY. The switches can be controlled by the signals used to control the state of the transistor 425, the transistor 426, the transistor 427, and the transistor 428 (the boost circuit). Whenever the boost circuit is providing the boost current to the write current, the switches are configured so that the resistor 430 and the resistor 431 are decoupled from node HX and node HY. For example, if the transistor 425 and the transistor 428 are on to provide the boost current, then the switch 435 is set to an open state (switch state controlled by signal BSTX1) to decouple the resistor 430 from node HX and switch 438 is set to an open state (switch state controlled by signal BSTY2) to decouple the resistor 431 from node HY. The switches in the matching circuit (switches 435, 436, 437, and 438) as well as switches in the remainder of the writer circuit 400 can be created from transistors and the resistors in the matching circuit (resistors 430 and 431) can also be created from transistors.

Figure 5:
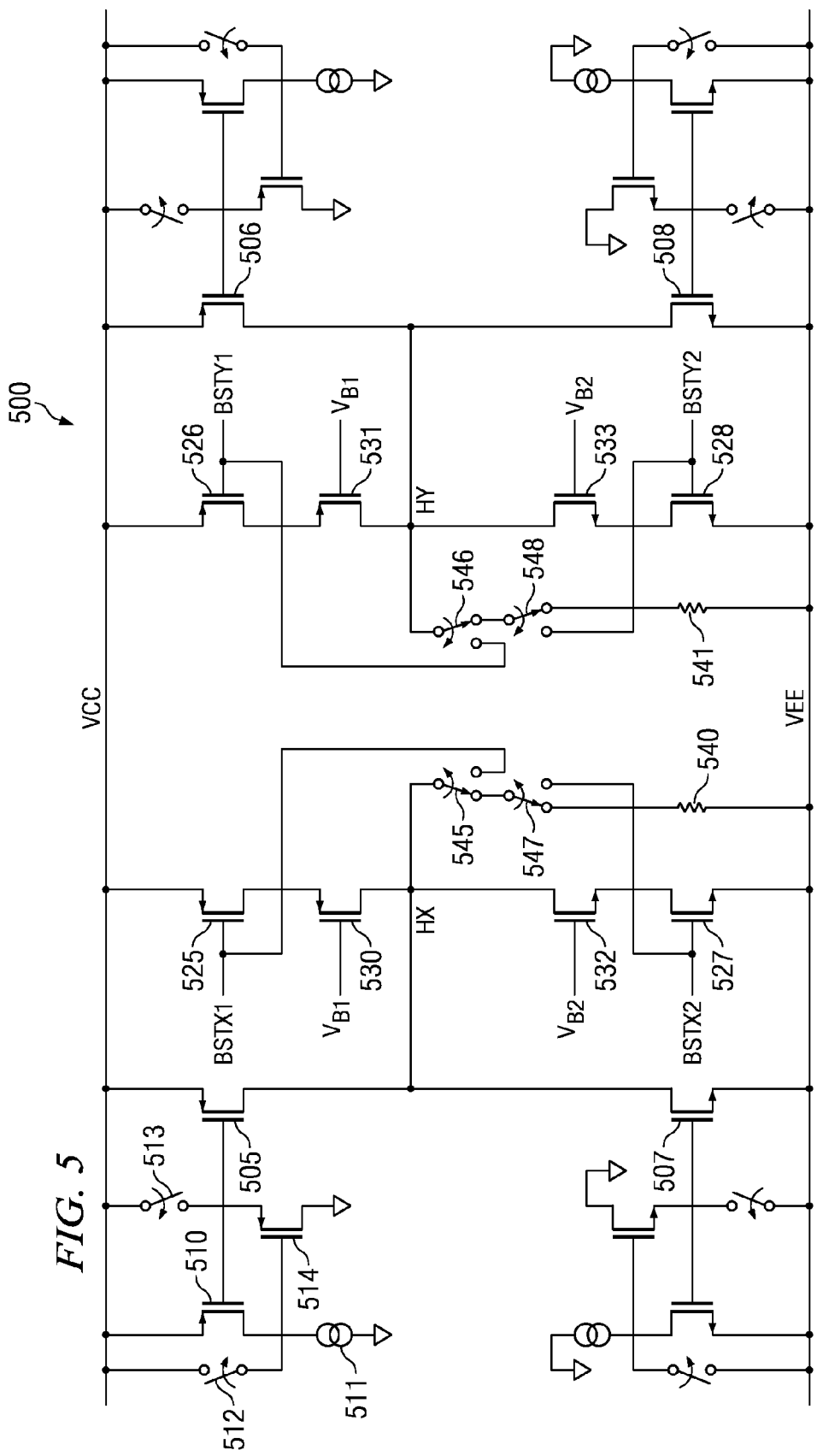
FIG. 5 is a diagram of a second exemplary writer circuit, according to a preferred embodiment of the present invention.

With reference now to FIG. 5, there is shown a diagram illustrating a second exemplary writer circuit 500 for use in providing a write current to an inductive write head 110, according to a preferred embodiment of the present invention. As with the writer circuit 400 illustrated in FIG. 4, the write current circuit of the writer circuit 500 comprises four transistors (transistor 505, transistor 506, transistor 507, and transistor 508) arranged in an H-bridge configuration. Like the write current circuit of the writer circuit 400, to permit a DC write current to flow with a certain polarity, a top transistor on a first side of the write current circuit (for example, the transistor 505) is turned on and a bottom transistor on a second side of the write current circuit (for example, the transistor 508) is also turned on, while the other two transistors of the write current circuit are turned off.

A current mirror, such as one including a transistor 510, operating in conjunction with a transistor of the write current circuit, such as the transistor 505, can provide the write current circuit. The current mirror duplicates a current provided by a current source 511 through the transistor 505, while a pair of switches (switch 512 and switch 513) can be used to activate or deactivate the current mirror and a transistor 514 provides additional strength to the current mirror. A similar current mirror configuration is provided for the transistor 508 to further increase the amount of write current available. Current mirror configurations are also used in the other half of the write current circuit to provide the write current with the opposite polarity.

A boost circuit of the writer circuit 500 makes use of a different configuration than the boost circuit of the write circuit 400 (FIG. 4). The boost circuit comprises eight transistors arranged in a cascade configuration. Similar to the boost circuit of the write circuit 400, there are four boost control signals (BSTY1, BSTX2, BSTY1, and BSTY2), with each boost control signal controlling a state of one transistor. Boost signal BSTX1 controls transistor 525, boost signal BSTY1 controls transistor 526, boost signal BSTX2 controls transistor 527, and boost signal BSTY2 controls transistor 528. Each of the four transistors is arranged in a cascade configuration with another transistor, with the transistor 525 being cascaded with transistor 530, the transistor 526 being cascaded with transistor 531, the transistor 527 being cascaded with transistor 532, and the transistor 528 being cascaded with transistor 533.

Whenever a transistor is turned on by its associated boost signal, the transistor that is connected to it is also turned on. For example, if the boost signal BSTX1 turns on the transistor 525, then the transistor 530 is also turned on and functions as a boost current source. To complete the boost current path in the example, the boost signal BSTY2 turns on the transistor 528, which turns on the transistor 533, completing a path for boost current as well as providing an additional boost current source (the transistor 533). The boost current can be programmed (the amount of boost current provided) by adjusting base voltages $V_{B1}$ and $V_{B2}$ of transistors 530, 531, 532, and 533.

The matching circuit of the writer circuit 500 is similar to the matching circuit of the writer circuit 400 (FIG. 4) and comprises two resistors, a resistor 540 and a resistor 541, with one resistor coupled to either node HX or node HY. The resistor 540 and the resistor 541 function to match an impedance difference between the writer circuit 500 and the inductive write head 110. The matching circuit also comprises switches (switch 545, switch 546, switch 547, and switch 548) that can be used to couple and de-couple the resistor 540 and the resistor 541 to node HX and node HY. The switches can be controlled by the signals used to control the state of the transistor 525, the transistor 526, the transistor 527, and the transistor 528 (the boost circuit). Whenever, the boost circuit is providing the boost current to the write current, the switches are configured so that the resistor 540 and the resistor 541 are decoupled from node HX and node HY. For example, if the transistor 525 and the transistor 528 (as well as the transistor 530 and the transistor 533) are on to provide the boost current, then the switch 545 is set to an open state (switch state controlled by signal BSTX1) to decouple the resistor 540 from node HX and switch 548 is set to an open state (switch state controlled by signal BSTY2) to decouple the resistor 541 from node HY.

Figure 6:
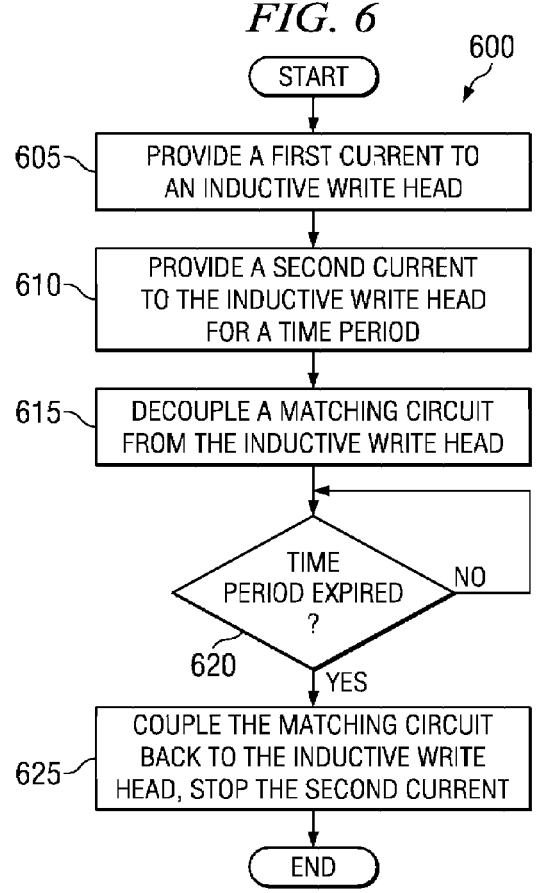
FIG. 6 is a diagram of a sequence of events in the operation of a writer circuit, according to a preferred embodiment of the present invention.

With reference now to FIG. 6, there is shown a diagram illustrating a sequence of events 600 in the operation of a writer circuit to write a transition in a magnetic flux onto a magnetic medium, according to a preferred embodiment of the present invention. The sequence of events 600 can be descriptive of operations performed by a writer circuit, such as the writer circuit 400 (FIG. 4) or the writer circuit 500 (FIG. 5), to record a transition in the magnetic flux on the magnetic medium, such as when a logic one (1) is to be stored in a mass storage device. The writer circuit can begin by providing a first current to an inductive write head of the mass storage device (block 605). For example, if the writer circuit is an implementation of the writer circuit 400 and a write current already flowing through the writer circuit 400 flows through the transistor 405, node HX, the inductive write head, node HY, and the transistor 408, then the writer circuit 400 will open the switch 412 as well as a switch associated with a current mirror containing the transistor 408. Then, the writer circuit 400 can close the switch 417 and a switch associated with a current mirror containing the transistor 407 to create a current path through the transistor 406, node HY, the inductive write head, node HX, and the transistor 407, with current sources coupled to current mirrors associated with the transistor 406 and the transistor 407 providing the first current.

In addition to providing the first current (block 605), the writer circuit also provides a second current to the inductive write head (block 610). However, rather than continuously providing the second current, the second current is provided for a specified time period. The specified time period can be a programmed interval. Referring back to an implementation of the writer circuit 400, the second current can be provided by turning on the transistor 426 by asserting control signal BSTY1 and the transistor 427 by asserting control signal BSTX2.

To improve the performance of the inductive write head, a matching circuit, which contains matching resistors, is decoupled from the inductive write head so that the resistors do not dissipate any write current (a combination of the first current and the second current) (block 615). According to a preferred embodiment of the present invention, the decoupling of the matching circuit from the inductive write head should be for a duration substantially equal to the specified time period. A programmable timer can be used to track the expiration of the specified time period. If the specified time period has not expired, the writer circuit 400 can continue to provide the second current (block 620). Once the specified time period expires, the writer circuit 400 can stop the second current (by turning off the transistor 426 and the transistor 427, for example) and recouple the matching circuit to the inductive write head (block 625). The stopping of the second current and the recoupling of the matching circuit to the inductive write head can be achieved by deasserting the control signal BSTY1 and the control signal BSTX2.

The providing of the second current (block 610) and the decoupling of the matching circuit from the inductive write head (block 615) can occur substantially simultaneously, or the second current (block 610) can be provided before the decoupling (block 615), or the decoupling (block 615) can be performed before the providing of the second current (block 610). It is possible to have either of the two events occur before the other or both events occurring at substantially the same time, with the same net effect.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A writer circuit for an inductive write head, the writer circuit comprising:
    a write current circuit coupled to the inductive write head, the write current circuit configured to provide a first current to the inductive write head and comprising four MOS transistors arranged in an H-bridge configuration; wherein each MOS transistor in the write current circuit mirrors a current provided by a current source to produce the first current and is part of a current mirror comprised of the MOS transistor and an additional MOS transistor;
    and wherein a switch is coupled in between a gate terminal of the MOS transistor and a gate terminal of the additional MOS transistor, and wherein the switch selectively breaks a current path in the current mirror;
    a metal-oxide semiconductor (MOS) transistor boost circuit coupled to the write current circuit, the MOS transistor boost circuit configured to provide a second current for a specified time period to the inductive write head responsive to a control signal, wherein a sum of the first current and the second current is a write current for the inductive write head; and a matching circuit coupled to the inductive write head, the matching circuit configured to selectively decouple a resistive element from the inductive write head responsive to the control signal.

2. The writer circuit of claim 1, wherein the resistive element is coupled to the inductive write head during part of a time period when the write current circuit is providing the first current, and wherein the resistive element is decoupled from the inductive write head when the MOS transistor boost circuit is providing the second current to the inductive write head.

3. The writer circuit of claim 2, wherein the resistive element comprises a resistor and a switch connected in series, and wherein the switch opens when the MOS transistor boost circuit is providing the second current to the inductive write head.

4. The writer circuit of claim 3, wherein the MOS transistor boost circuit provides the second current when the control signal is active, wherein a state of the switch is controlled by the control signal, and wherein the switch opens when the control signal is active.

5. The writer circuit of claim 1, wherein each current mirror further comprises a strengthening transistor having a control terminal coupled to a source terminal of the additional MOS transistor, the strengthening transistor configured to increase the current mirroring capability of the current mirror.

6. The writer circuit of claim 1, wherein the MOS transistor boost circuit comprises four transistors arranged in an H-bridge configuration, and wherein a gate terminal of each transistor is coupled to a unique control signal.

7. The writer circuit of claim 6, wherein the resistive element comprises a pair of matching elements with a matching element located on each side of the inductive write head, wherein each matching element comprises two switches and a resistor sequentially connected, and wherein the state of each switch is controlled by a unique control signal that is also used to control the state of one of the four transistors in the MOS transistor boost circuit.

8. A writer circuit for an inductive write head, the writer circuit comprising:

a write current circuit coupled to the inductive write head, the write current circuit configured to provide a first current to the inductive write head and comprising four MOS transistors arranged in an H-bridge configuration; wherein each MOS transistor in the write current circuit mirrors a current provided by a current source to produce the first current and is part of a current mirror comprised of the MOS transistor and an additional MOS transistor;

and wherein a first switch is coupled between a gate terminal of the MOS transistor and power rail and a second switch is coupled between a source terminal of the additional MOS transistor and the power rail, and wherein the first switch and the second switch selectively break a current path in the current mirror;

a metal-oxide semiconductor (MOS) transistor boost circuit coupled to the write current circuit, the MOS transistor boost circuit configured to provide a second current for a specified time period to the inductive write head responsive to a control signal, wherein a sum of the first current and the second current is a write current for the inductive write head; and a matching circuit coupled to the inductive write head, the matching circuit configured to selectively decouple a resistive element from the inductive write head responsive to the control signal.

9. The writer circuit of claim 8, wherein the MOS transistor boost circuit comprises four pairs of serially coupled transistors arranged in an H-bridge configuration, and wherein each pair of serially coupled transistors comprises a first transistor with a gate terminal coupled to a control signal and a second transistor with a gate terminal coupled to a voltage reference.

10. A mass storage device comprising:

a magnetic storage media for storing information in the form of magnetic flux;

an inductive write head magnetically coupled to the magnetic storage media, the inductive write head configured to impart a magnetic flux of desired orientation based on a write current flowing through the inductive write head;

a write current circuit coupled to the inductive write head, the write current circuit configured to provide a first current to the inductive write head and comprising four MOS transistors arranged in an H-bridge configuration; wherein each MOS transistor in the write current circuit mirrors a current provided by a current source to produce the first current and is part of a current mirror comprised of the MOS transistor and an additional MOS transistor;

and wherein a switch is coupled in between a gate terminal of the MOS transistor and a gate terminal of the additional MOS transistor, and wherein the switch selectively breaks a current path in the current mirror;

a metal-oxide semiconductor (MOS) transistor boost circuit coupled to the write current circuit and the inductive write head, the MOS transistor boost circuit configured to provide a second current for a specified time period to the inductive write head responsive to a control signal, wherein the write current is a sum of the first current and the second current; and a matching circuit coupled to the inductive write head, the matching circuit configured to selectively decouple a resistive element from the inductive write head responsive to the control signal.

11. The mass storage device of claim 10, wherein the magnetic storage media is a rigid rotating magnetic disk, a flexible rotating magnetic disk, a magneto-optical disk, or a magnetic tape.

12. The mass storage device of claim 10, wherein a transition in the magnetic flux represents a binary value stored on the magnetic storage media, wherein the transition is stored on the magnetic storage media by reversing a polarity of the write current, and wherein the second current is provided at substantially the same time as the reversal of write current polarity.

13. The mass storage device of claim 12, wherein the second current is provided for a specified period of time, and wherein the specified period of time is substantially equal to a time required to transition between a first polarity of the write current to a second polarity of the write current.

14. The mass storage device of claim 12, wherein the resistive element is decoupled from the inductive write head while the second current is being provided.

15. The mass storage device of claim 10, wherein the mass storage device is a hard disk drive.

* * * * *